(12) United States Patent
Namjoshi et al.

(10) Patent No.: US 9,083,731 B2
(45) Date of Patent: *Jul. 14, 2015

(54) METHOD AND APPARATUS FOR PATTERN MATCHING FOR INTRUSION DETECTION/PREVENTION SYSTEMS

(71) Applicant: ALCATEL LUCENT, Paris (FR)

(72) Inventors: Kedar S Namjoshi, Basking Ridge, NJ (US); Girija J Narlikar, Mumbai (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,620

(22) Filed: Jan. 28, 2014

(65) Prior Publication Data

US 2014/0143874 A1 May 22, 2014

Related U.S. Application Data

(63) Continuation of application No. 12/610,825, filed on Nov. 2, 2009, now Pat. No. 8,683,590.

(60) Provisional application No. 61/197,885, filed on Oct. 31, 2008.

(51) Int. Cl.
*G06F 11/00* (2006.01)
*H04L 29/06* (2006.01)
*G06F 21/55* (2013.01)
*G06K 9/00* (2006.01)
(Continued)

(52) U.S. Cl.
CPC .......... *H04L 63/1408* (2013.01); *G06F 21/552* (2013.01); *H04L 63/0263* (2013.01); *H04L 63/1416* (2013.01)

(58) Field of Classification Search
USPC .............. 713/153–154, 187–188, 193–194; 726/1, 13, 22–33; 709/206, 249, 389
See application file for complete search history.

(56) References Cited

U.S. PATENT DOCUMENTS

2004/0184663 A1 * 9/2004 Akagi ........................... 382/229
2005/0240999 A1 10/2005 Rubin et al.
(Continued)

OTHER PUBLICATIONS

Ken Thompson, "Programming Techniques, Regular Expression Search Algorithy," Communications of the ACM, vol. 11, No. 6, Jun. 1968 pp. 419-422.

(Continued)

*Primary Examiner* — Evans Desrosiers
(74) *Attorney, Agent, or Firm* — Wall & Tong, LLP

(57) ABSTRACT

A system, method, apparatus and mechanism for estimating worst-case time complexity of a regular expression defining a pattern adapted for identifying malicious packets and comprising one or more back-references (backref-regex) by constructing a non-deterministic finite automaton (NFA) corresponding to the backref-regex (backref-NFA), wherein the backref-NFA comprises a plurality of NFA-states and a respectively labeled edge for each of the one or more back-references of the backref-regex; performing liveness analysis on the backref-NFA to determine for each NFA-state of the backref-NFA a set of back-references alive at the NFA-state; and determining a maximum number of alive back-references over the plurality of NFA-states, wherein the determined maximum number is indicative of the worst-case time complexity of the backref-regex.

20 Claims, 8 Drawing Sheets

(51) Int. Cl.
*G06K 9/68* (2006.01)
*G06K 9/72* (2006.01)

(56) References Cited

U.S. PATENT DOCUMENTS

2008/0071779 A1* 3/2008 Mammen et al. ............... 707/6
2009/0083265 A1* 3/2009 Michailov ................... 707/6

OTHER PUBLICATIONS

Will Drewry and Tavis Ormandy, "Insecure Context Switching: Inoculating Regular Expressions for Survivability" WOOT'08: Proceedings of the $2^{nd}$ Conference on USENIX Workshop on Offensive Technologies.

Michela Becchi and Patrick Crowley, "Extending Finite Automata to Efficiently match Perl-Compatible Regular Expressions,", CoNEXT 1008, Dec. 9-12, 2008, Madrid, Spain.

Randy Smith et al., "Backtracking Algorithmic Complexity Attacks Against a NIDS", ACSAC, 2006.

Russ Cox, "Regular Expression Matching Can Be Simple and Fast," http://swtch.com/~rsc/regexp1.html, Jul. 28, 2008.

A.V. Aho et al.,"Compilers: Principles, Techniques & Tools, Second Edition,"Addison-Wesley, 2007.

* cited by examiner

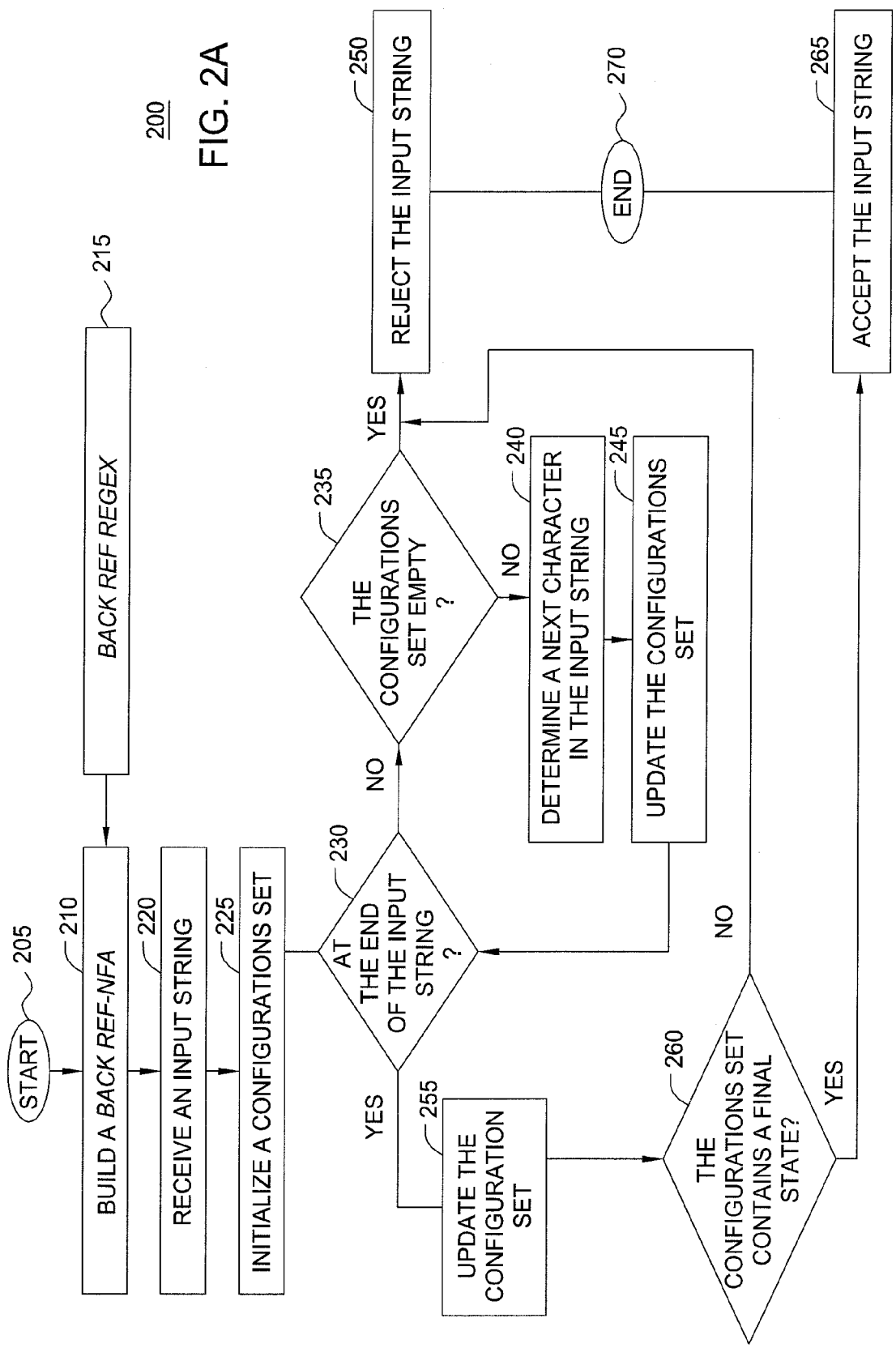

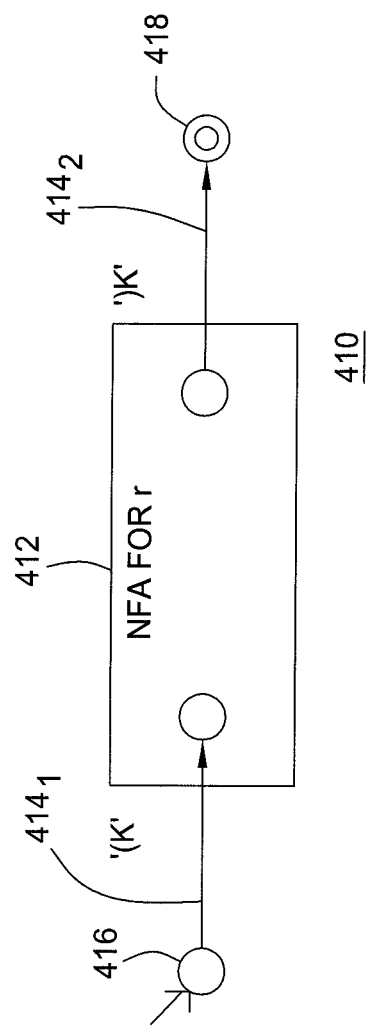
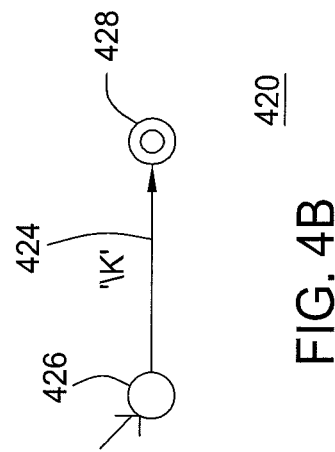
FIG. 4A
FIG. 4B

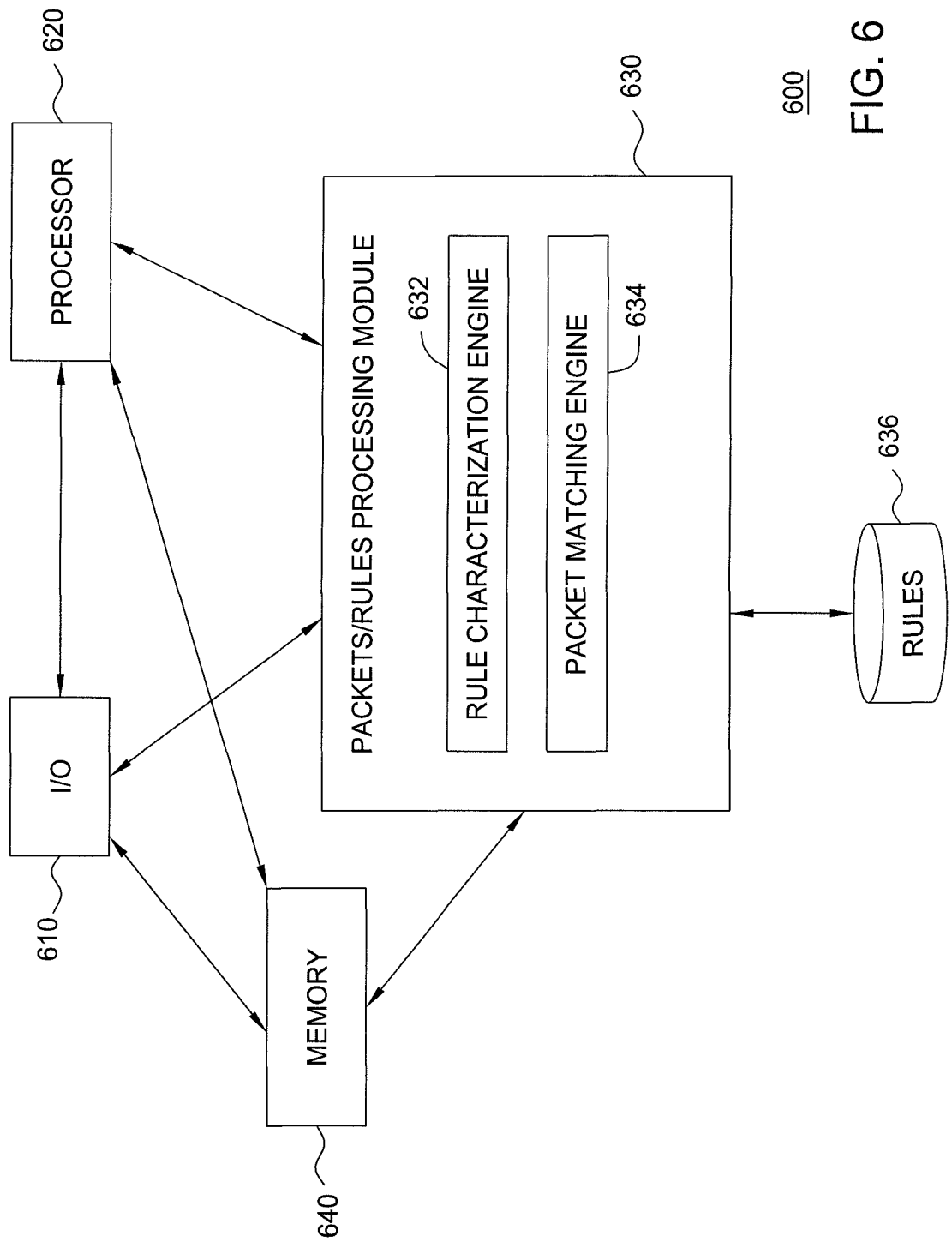

METHOD AND APPARATUS FOR PATTERN MATCHING FOR INTRUSION DETECTION/PREVENTION SYSTEMS

CROSS-REFERENCE TO RELATED APPLICATIONS

This application is a continuation of pending U.S. patent application Ser. No. 12/610,825, filed on Nov. 2, 2009, entitled METHOD AND APPARATUS FOR PATTERN MATCHING FOR INTRUSION DETECTION/PREVENTION SYSTEMS which application claims the benefit of U.S. Provisional Patent Application Ser. No. 61/197,885, filed Oct. 31, 2008, entitled "TECHNIQUE FOR CONSTRUCTING ROBUST, ATTACK-RESISTANT INTRUSION DETECTION/PREVENTION SYSTEMS (IDS/IPS)"; both prior applications are hereby incorporated by reference herein in their entireties.

FIELD OF THE INVENTION

The invention relates to the field of communications networks and, more specifically, to pattern matching by intrusion detection systems (IDSs) and intrusion prevention systems (IPSs).

BACKGROUND OF THE INVENTION

Signature-based intrusion detection systems (IDSs) or intrusion prevention systems (IPSs), such as Snort®, Bro, Cisco Security Appliance, Citrix® Application Firewall, and the like, protect a network by examining headers and content of all packets entering or leaving the network. Such systems raise alerts and/or drop packets upon detecting suspicious headers or payloads. In general, a suspicious packet is detected by matching the packet against a database of rules, where each rule represents a particular signature/pattern of a security exploit.

To represent security exploits as accurately and precisely as possible, the IDS/IPS rule syntax should be sufficiently powerful. Otherwise, a large number of good packets may be incorrectly marked as harmful, or harmful packets may go undetected. Moreover, the packet processing rate should keep up with high line speeds without dropping packets or allowing bad packets through. These two goals often conflict because of the direct relationship between the expressiveness and complexity of the rule language and the packet processing time. One of the common IDS/IPS rule syntaxes is regular expressions. However, unless the rules are written with care and the underlying pattern matching is implemented carefully, processing of a packet may take a long time to complete. The resulting performance vulnerability may be exploited by an attacker to generate a low-bandwidth denial-of-service (DoS) attack on the IDS/IPS itself. Such vulnerability can typically be traced back to the backtracking-based pattern matching of regular expressions.

When only regular expressions define the rules, this vulnerability may be avoided, for example, by using deterministic matching process. However, increasingly, the rules are written using an extension of regular expressions with back-references, known as the full regex syntax, to which known deterministic matching processes cannot be applied. The backtracking-based pattern matching is generally the only option available for matching regular expressions with back-references (backref-regexes). Accordingly, embedding such backref-regexes expressions with regular expressions that cause the backtracking algorithms to exhibit exponential behavior may cause serious performance vulnerability. Further, unrestricted use of regular expressions, and regular expressions with back-references in particular, makes it challenging to predict worst-case performance, and therefore, to guard in advance against performance attacks.

To minimize the performance vulnerability, various guidelines have been offered, including avoiding back-references and/or backtracking, using a memory-efficient deterministic algorithm for regular expressions, using only well-tested regular expressions, avoiding known patterns that incur exponential behavior, and limiting time and memory requirements of the matching phase. However, such guidelines are often inapplicable in the context of the IDSs/IPSs. In particular, as new security exploits appear, IDS/ISP patterns are continually added and updated, primarily by network managers or security professionals, who are not cognizant of the underlying pattern matching processes. Further, some security exploits, e.g., buffer overflow attacks, are most accurately and precisely expressed with complex syntax like full regex. Limiting time or memory may result in failure to detect bad packets or dropping of harmless packets. Therefore limiting the IDS rule syntax, enforcing time or memory restrictions, and/or relying on the prudence of the rule writers is not appropriate for IDS/IPS applications.

SUMMARY OF THE INVENTION

Various deficiencies in the prior art are addressed through methods and apparatuses for analyzing packets and determining time complexity of backref-regexes. In one embodiment, a method for analyzing packets includes comparing an input string representing a received packet with a pattern defined by a backref-regex. Such a comparison is performed via a single pass of a non-deterministic finite automaton (backref-NFA) representing the backref-regex, including its back-references.

The input string includes multiple characters representing, for example, values of various fields of the packet. Characters of the string are selected in a sequence, character-by-character, and analyzed until a determination of a match or no match between the input string and the pattern is made. When a character is selected, a configurations-set, including one or more configurations, is updated. Each of the configurations is associated with a respective non-deterministic finite automaton (NFA) state of the backref-NFA and adapted to monitor whether the character is being matched against a particular back-reference of the backref-NFA.

In one embodiment, the configurations-set is updated by adding configurations reachable from the one or more configurations of the configurations-set without consuming the character, and then determining all configurations that are reachable, by consuming the character, from the configurations in the configurations-set, including the just added configurations. The newly determined configurations form an updated configurations-set, which is used to analyze a next character in the string. If the string has ended, then the most recent configurations-set is updated with configurations reachable without character consumption from the configurations in the configurations-set and analyzed to determine whether the configurations-set includes a configuration associated with a final state. When the final state is found, the match between the string and the pattern is determined. Otherwise, no match is possible. If at any point, the configurations-set becomes empty, no new characters in the string are selected and no-match is possible between the string and the pattern.

One embodiment provides for a method for estimating worst-case time complexity of matching a backref-regex. The method includes constructing a backref-NFA corresponding to the backref-regex, where the backref-NFA includes NFA-states and respectively labeled edges for back-references of the backref-regex. Embodiments of the method further include performing liveness analysis on the backref-NFA to determine live back-references for each NFA-state of the backref-NFA. Upon concluding the liveness analysis, the maximum number of live back-references over all the NFA-states of the backref NFA is determined. Such a maximum number is indicative of the time complexity of the backref-regex. When multiple rules are analyzed, each rule that has the time-complexity above a pre-defined threshold is flagged to a user.

BRIEF DESCRIPTION OF THE DRAWINGS

The teachings of the present invention can be readily understood by considering the following detailed description in conjunction with the accompanying drawings, in which:

FIG. 2A depicts a high-level block diagram of a method for analyzing packets, according to one embodiment;

FIGS. 4A and 4B depict examples of components of an extended non-deterministic finite automaton (NFA), referred herein as backref-NFA, according to one embodiment;

FIG. 6 depicts a high-level diagram of a computer suitable for use in performing the functions described herein, according to one embodiment.

To facilitate understanding, identical reference numerals have been used, where possible, to designate identical elements that are common to the figures.

DETAILED DESCRIPTION OF THE INVENTION

Robust and fast pattern matching for intrusion detection systems (IDSs) and intrusion prevention systems (IPSs) is disclosed. Methods and apparatuses described herein provide for on-the-fly deterministic matching of packets against rules (patterns) describing malicious packets, where the rules are defined by regular expressions with back-references (back-ref-regexes) and facilitate predictable, robust behavior in practice. Further, techniques described herein provide for compile-time analysis resulting in tight worst-case matching costs, decrease in run time space usage, and improved performance. Rule-by-rule analysis of the worst case matching costs allow for automatic detection and isolation of potentially "bad" rules and facilitate robust performance in the face of malicious packets.

The description and drawings presented herein merely illustrate the principles of the invention. It will be thus appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors for furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
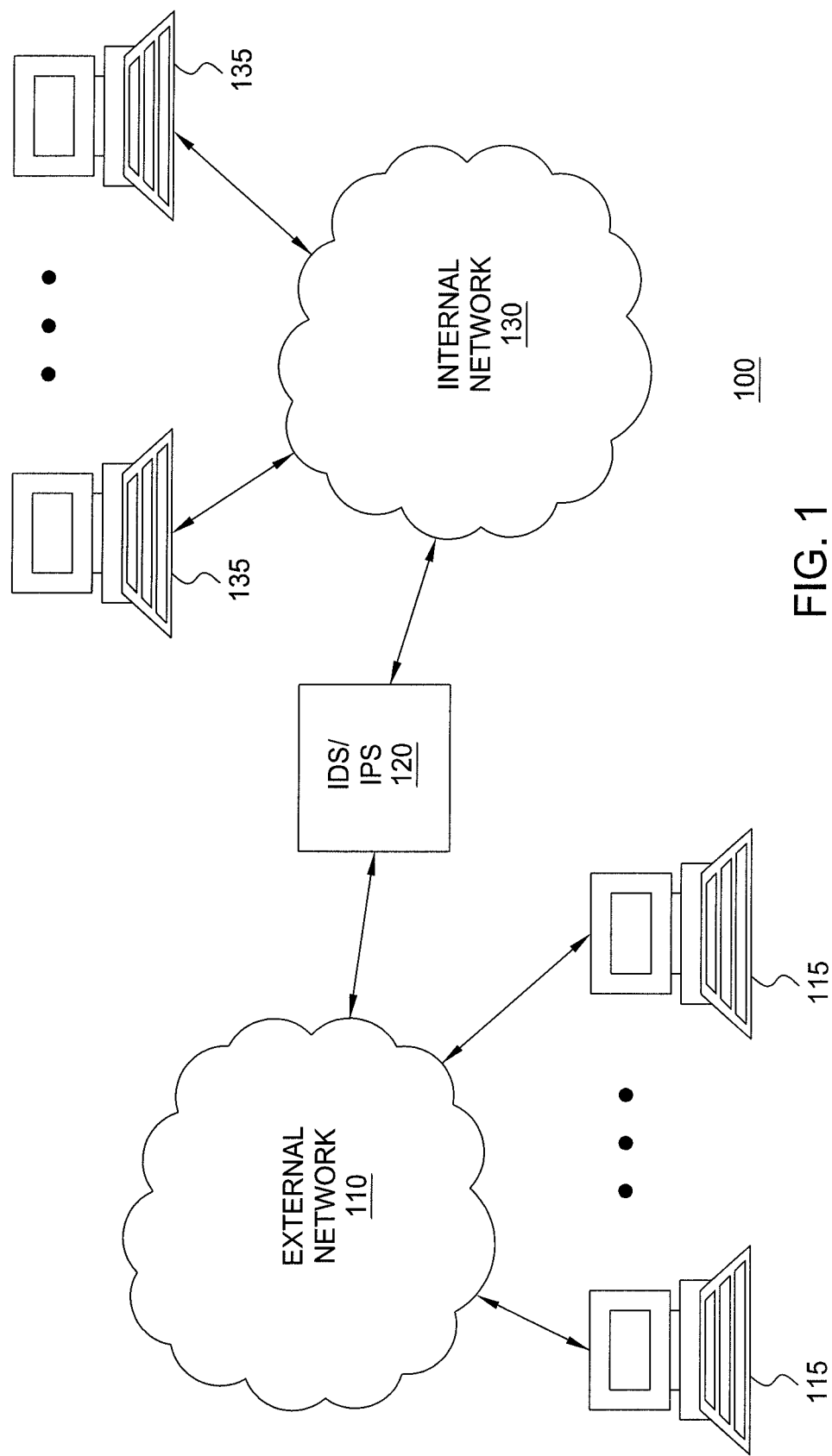
FIG. 1 illustrates a high-level diagram of a network environment, according to one embodiment.

FIG. 1 illustrates an example of a network environment in which data packets are transmitted between an external network and a secured internal network, according to one embodiment. In a network environment 100, packets may be transmitted from an external host 115 over an external network 110 and an internal network 130 toward an internal host 135 and back. As depicted in FIG. 1, before packets enter or leave the internal network 130, the packets are validated by an Intrusion Detection System (IDS)/Intrusion Prevention System (IPS) 120.

The IDS/IPS 120 examines packets by comparing headers and/or content of the packets with pre-defined rules/policies/filters representing various security exploits. A rule/policy/filter definition may be based on packet parameters, such as protocol, source address, destination address, source port, destination port, source interface, destination interface, and others, and/or one or more lists of such parameters. The rule/policy/filter may include a set of one or more rules/policies/filters. In one embodiment, the IDS/IPS 120 applies multiple pattern matching rules/policies/filters to the incoming packets. For example, an incoming packet may first be classified according to header information, and then, by whether the packet matches a set of representative keywords taken from full rules. Usually, such actions eliminate most rules from consideration. If some rules remain, the packet is then matched against the remaining rules. In one embodiment, at least some of such rules are defined using backref-regexes.

FIG. 2A depicts a high-level block diagram of a method 200 for analyzing packets, according to one embodiment. More specifically, the method 200 provides for determining whether a packet represented by an input string is a malicious packet and thus, allows to determine whether the packet should be accepted, e.g., allowed into/out of an internal network, such as the internal network 130, or rejected, e.g., dropped, blocked, logged, quarantined, etc. Although primarily depicted and described herein as being performed sequentially, at least a portion of the steps of the method 200 may be performed contemporaneously, or in an order different than depicted and described with respect to FIG. 2A. Furthermore, not all steps depicted in FIG. 2A are always necessary and at least some of the steps may be performed prior to the execution of the method 200.

The method 200 begins at step 205 and proceeds to step 210. At step 210, a non-deterministic finite automaton 210 corresponding to a backref-regex 215 is built. In general, the non-deterministic finite automaton 210 is a modified NFA that includes a respective representation for each back-reference of the backref-regex 215. The non-deterministic finite automaton 210 referred herein as backref-NFA.

According to one embodiment, patterns/rules adapted to identify malicious packets are defined by backref-regexes. Formally, syntax for traditional regular expressions (i.e., without back-references) is defined by the following grammar:

$$r = \text{epsilon OR } a \text{ OR } rs \text{ OR } r|s \text{ OR } s^*\text{OR}(s) \qquad (1)$$

where 'r' and 's' are regular expressions built using such a grammar and 'a' represents a letter. According to one embodiment, to define backref-regexes, such as the backref-regex 215, formally, the grammar (1) is extended with the following operator: r:=\B, where B is a number, specifying the $B^{th}$ bracketed sub-expression.

Methods for constructing an NFA based on the traditional regular expression are known. For example, one of such methods is described in "Compilers: Principles, Techniques, & Tools", by Alfred V. Aho, Monica S. Lam, Ravi Sethi, and Jeffrey D. Ullman, Second Edition, Addison-Wesley, 2007, sections 3.7.2, 3.7.3, pages 159-161, which is hereby incorporated by reference in its entirety ("Aho"). The traditional NFA is defined in general by a set of states and a next-state function, which determines its move based on either an input symbol, or spontaneously ("epsilon" move/transition). According to one embodiment, the traditional NFA and NFA construction method are extended to provide for representations of the backref-regex's back-references and incorporating such representations into the backref-NFA.

More specifically, to handle the new operator of the extended syntax, the NFA construction method is modified to allow for additional labels on edges of the NFA. In particular, the following scenarios of regular expressions are modified:

$$r:=(s), \text{where this is the } k^{th} \text{ bracket} \quad (a)$$

$$r:=\backslash B \quad (b)$$

When the backref-regex includes scenario (a), the NFA is extended with components shown in FIG. 4A, where additional labels indicate opening and closing brackets of a pair of matching brackets. When the backref-regex includes scenario (b), the NFA is extended with components shown in FIG. 4B, where an additional label denotes a particular back-reference, such as '\k.' At runtime, the expression r is assigned the exact substring that has already been matched against the $k^{th}$ bracketed sub-expression during the matching process up to the current point.

According to one embodiment, the backref-NFA is formally defined by a tuple $(B, Q, Q_0, \delta, \Sigma, F)$, where B is the number of back-references, numbered 1 ... B, Q is a finite set of states, $Q_0$ is a subset of Q, defining the initial states, $\Sigma$ is the input alphabet, the set of legal symbols in a word, $\delta: Q \times (\Sigma \cup \{\epsilon\} \cup \{(_k, )_k, \backslash k: 1 \leq k \leq B\}) \rightarrow 2^Q$ is the transition relation.

F, a subset of Q, is a set of final states

'$(_k$' and '$)_k$' are the new transition symbols that indicate respectively the start and end of the matching brackets k. '\k' is a new transition symbol that indicates a back-reference k.

In particular, to construct the backref-NFA based on the backref-regex, for each bracketed portion, e.g., '(r)' where r is a regular expression, additional transition edges labeled with notes indicating the opening and closing of a pair of matching brackets embedding the bracketed portion are created. Returning to FIG. 4A, for ease of understanding, assume that r is a regular expression without back-references or brackets. To construct the backref-NFA for a backref-regex containing a pair of brackets k encompassing the regular expression r, first, a traditional NFA for the regular expression 'r' is constructed using, for example, the technique referenced above.

Then, transitional edges $414_1$ and $414_2$ are added on both sides of the constructed NFA and labeled respectively with '$(_k$' and '$)_k$' to identify the opening and closing brackets of the pair of matching brackets k. The transitional edge $414_1$ provides for an epsilon-transition from a last state 416 of the backref-NFA's portion preceding the brackets k to a first state of the NFA constructed for 'r'. If the regular expression embedded into the brackets k represents the last portion of the backref-regex, the transitional edge $414_2$ provides for an epsilon-transition from the last state of the NFA to a final state 418.

Further, to create a representation for each back-reference of the backref-regex, e.g., '\k', a respective additional transition edge labeled with a 'match' note is created in the backref-NFA. Returning to FIG. 4B, consider the following expression: 'r\k', where r is a regular expression. To construct the backref-NFA for this expression, first, an NFA for the regular expression 'r' is constructed using one of above discussed techniques. Then, a transitional edge 424 is created and labeled '\k' to denote the back-reference. The transitional edge 424 is added to connect a last state 426 of a backref-NFA's portion preceding the brackets k, e.g., backref-NFA representing the expression R, to a final state 428. To transition between the state 426 and final state 428 during the run of the backref-NFA, a match for the back-reference k must be determined.

Note that though in the above described examples r is a regular expression without brackets or back-references, similar techniques are applicable when r is a full regex that includes brackets and/or back-references. In general, there is no limit on the number of levels of brackets and/or back-references that the backref-regex r may contain. In one embodiment, when the backref-regex is a multi-level expression, the above described techniques are applied level-by-level, beginning with lower levels and moving up towards the most general level. This may be done in sequence for each of the back-references or in parallel.

Figure 5A:
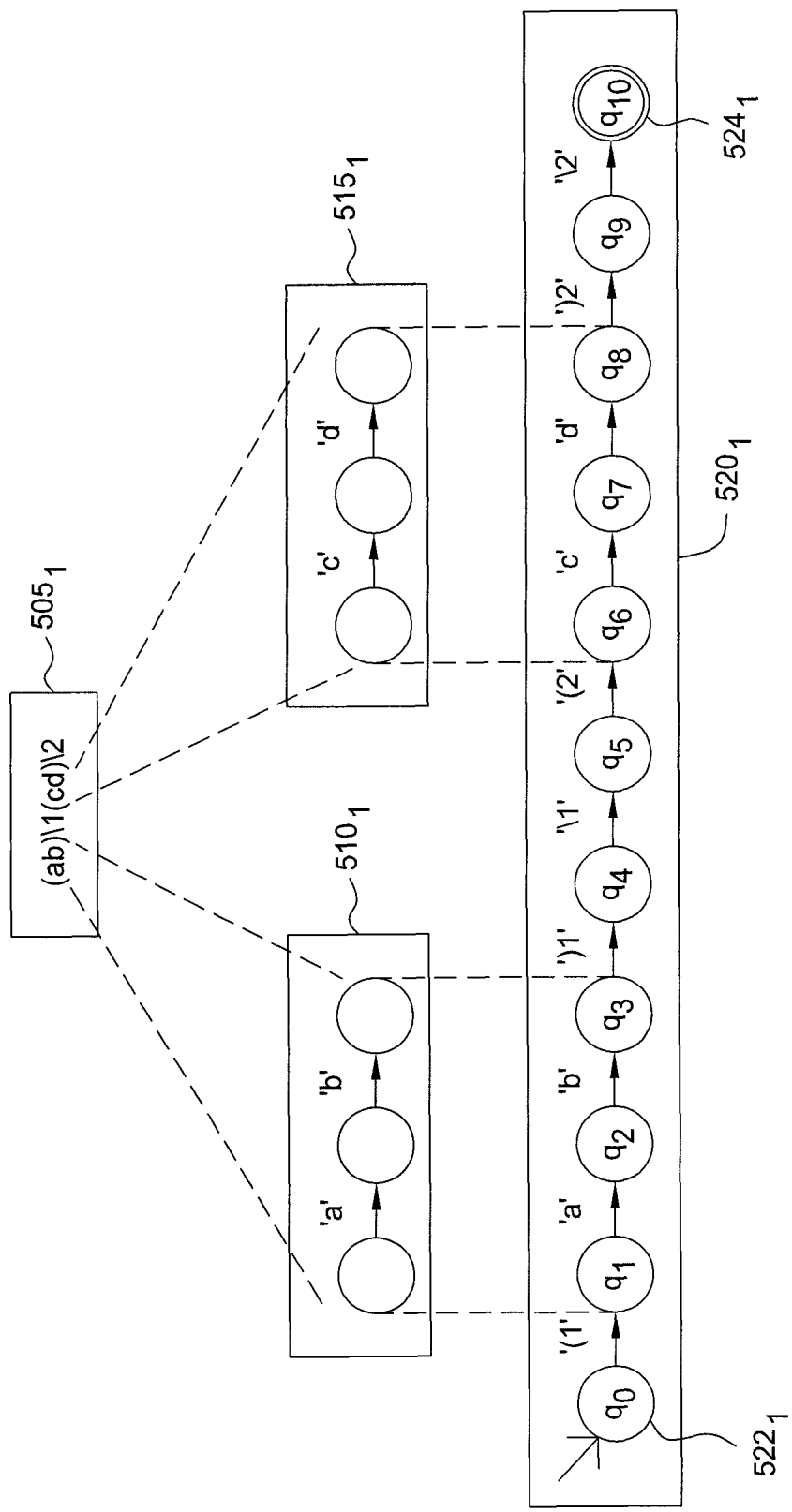
FIGS. 5A and 5B depict examples of regular expressions with back-references and corresponding backref-NFAs, according to one embodiment.
Figure 5B:
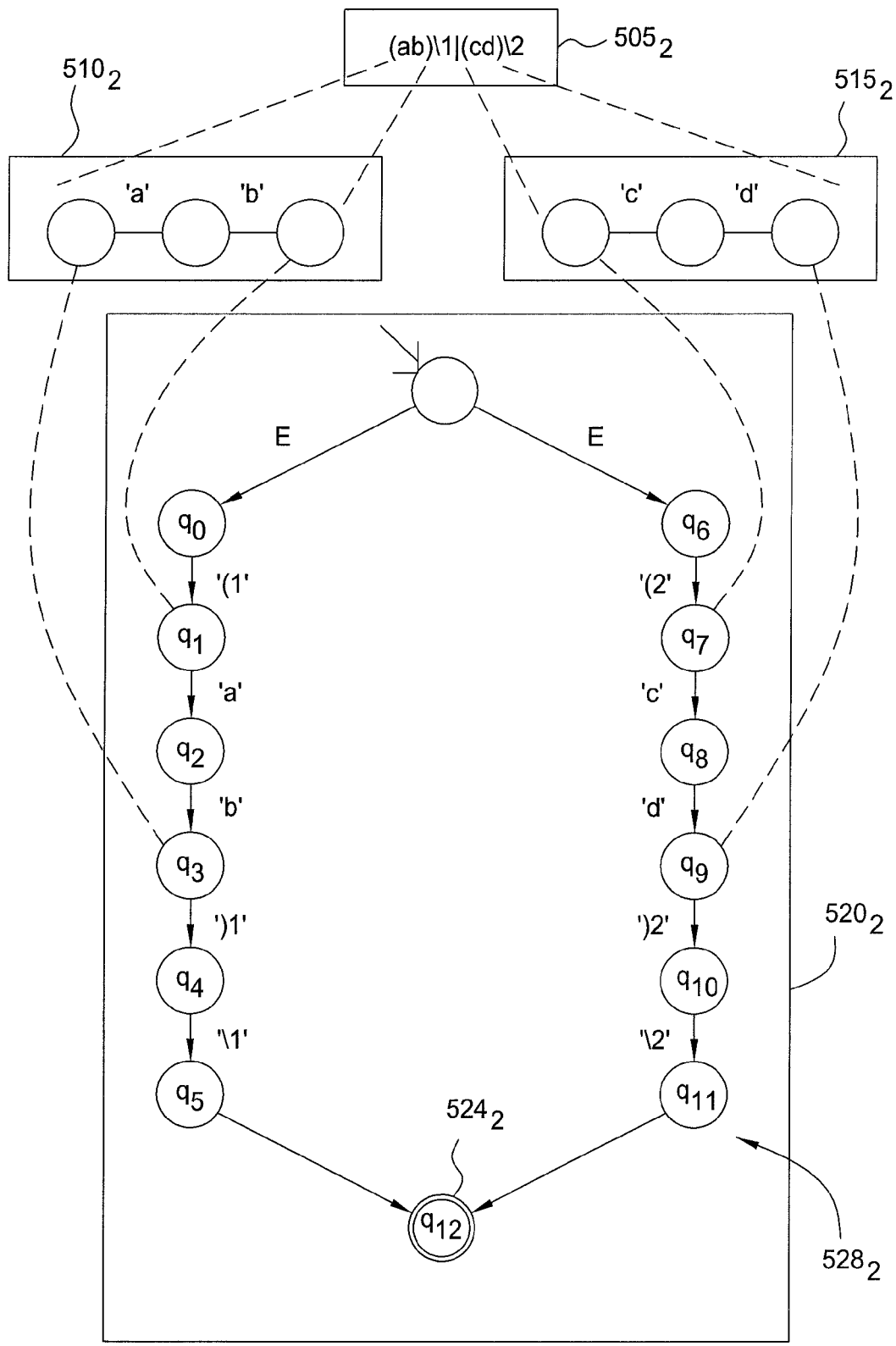

FIGS. 5A and 5B provide specific examples of backref-regexes and corresponding backref-NFAs. More specifically, FIG. 5A shows a backref-regex $505_1$ defined as follows, '(ab)\1 (cd)\2'. The backref-regex $505_1$ includes two bracket pairs, each containing a regular expression and two back-references, one after each bracket pair. A string including substring 'ababcdcd' matches such an expression. The regular expressions within the bracket pairs do not include back-references, and thus, standard NFAs, items $510_1$ and $515_1$ respectively may be constructed in accordance with the techniques described above. Each such NFA includes NFA-states that, in general, define paths within the NFA that are followed during the run to determine a match. Typically, to transition between two NFA-states during the run, a particular character or expression associated with an edge between the two NFA-states must be present in an input string at a proper position. For example, character 'a' is required to transition from the NFA-state $q_1$ to the NFA-state $q_2$. However, as discussed above, some transitions are epsilon transitions, i.e., transition that do not consume a character of the input string.

After the NFAs $510_1$ and $515_1$ are constructed, edges are added on both sides of each of the NFAs $510_1$ and $515_1$ and labeled to identify respectively the opening and closing brackets. For example, an edge between NFA-states $q_0$ and $q_1$ represents the opening bracket and an edge between NFA-states $q_3$ and $q_4$ represents the closing bracket. NFA-state $q_0$ is an initial state. Furthermore, additional edges labeled with match notes are created to represent the back-references of backref-regex $505_1$. For example, an edge between NFA-states $q_4$ and $q_5$ that is labeled with back-reference '\1' is constructed. In one embodiment, to transition from the NFA-state $q_4$ and to the NFA-state $q_5$, a match for the back-reference 2 must be determined. In other words, a substring 'cd' must be followed by another substring 'cd' to transition from the NFA-state $q_4$ and to the final NFA-state $q_5$.

The backref-regex of FIG. 5B is similar to the backref-regex of FIG. 5A with one exception. The backref-regex $505_1$ of FIG. 5A requires each character of the backref-regex $505_1$ to be present in an input string for the match to occur. On other hand, for the input string to match the backref-regex $505_2$ of FIG. 5B, only one of the two portions of the backref-regex $505_2$ is required to be present in the string, where the portions are separated by the vertical line. Accordingly, strings containing either of the following substrings would match the backref-regex $505_2$: 'abab' or 'cdcd.' The backref-NFA $520_2$ is constructed in a manner similar to the one described above regarding the backref-NFA $520_1$, where two alternative paths in the graph shown in FIG. 5B provide for the two possible substrings that can match the backref-regex $505_2$, i.e., paths '$q_0 \rightarrow q_1 \rightarrow q_2 \rightarrow q_3 \rightarrow q_4 \rightarrow q_5$' and '$q_6 \rightarrow q_7 \rightarrow q_8 \rightarrow q_9 \rightarrow q_{10} \rightarrow q_{11}$'.

Returning to FIG. 2A, at step 220, a packet or an input string representing a packet is received. For example, a packet or its portion may be viewed as an input string containing multiple characters. In general, according to method 200, such characters are consecutively analyzed until a determination is made that the packet matches or does not match the rule represented by the backref-NFA.

In one embodiment, the method 200 provides for an extension of a matching process for a traditional regular expression to provide for matching of back-references. The traditional matching process works in two phases:

First, a regular expression is compiled into an NFA, via recursion on the structure of the regular expression.

Second, on any input string, the matching algorithm scans the string from left to right, maintaining a set of active NFA-states. If, upon reaching the end of the string, an accepting state of the NFA appears in the current active set, the string is accepted; otherwise, the string is rejected.

This process is on-the-fly process because each character is scanned at most once.

According to one embodiment, each position in an input string is now associated with a configuration, rather than simply with an NFA-state. The set of configurations is referred to as C. In general, a configuration records the current NFA-state, substring information for already scanned brackets, and whether a particular back-reference is in the process of being matched.

Formally, the configuration is a triple $(q, \mu, s)$, where q is a NFA-state of the backref-NFA, $\mu$ is a pair of partial functions, $(\mu_L, \mu_R)$, both from [1 ... B] to [0 ... m−1]. For any b, $(\mu_L(b), \mu_R(b))$, if defined, indicates a substring of the input string which matches bracket b. '⊥' is used to indicate a totally undefined function.

s is either NOMATCH, or MATCH (b, i), where b is a bracket number in 1 ... B, and i is an index.

A run of the backref-NFA A=(B, Q, $Q_0$, δ, Σ, F) on an input string w with length (i.e., number of characters) m is given by a sequence r=($c_0$, $i_0$); ($c_1$; $i_1$); ... which associates each position of the word with a configuration. The sequence must satisfy the following constraints:

the first position is 0, and the first configuration is initial, i.e., $i_0$=0, and $c_0$=(q, ⊥, NOMATCH), where q∈$Q_0$.

successive pairs are related by automaton transitions as follows. If (c=(q, μ, s), i) and (c'=(q', μ', s'), i') are successive pairs, then one of the following constraints must hold (epsilon-transition) q'∈δ (q, ε) and i'=i, μ'=μ, and s'=s (input-transition) q'∈δ (q, w (i)) and i'=i+1, μ'=μ, and s'=s (start-bracket) This transition records the start of a bracket. For some b, q'∈δ (q, ($_b$), i'=i, $\mu_L$' is $\mu_L$ extended with b mapped to i, and $\mu_R$'=$\mu_R$.

(end-bracket) This transition records the end of a bracket. For some b, q'∈δ (q,)$_b$), i'=i, $\mu_L$(b)=j, for some j, and $\mu_L$'=$\mu_L$, $\mu_R$' is $\mu_R$ extended with b mapped to i, and s'=s.

(begin-matching) s=NOMATCH, μ(b) is defined, q has a single transition on \b for some k, and s'=MATCH (b, 0), μ'=μ, q'=q, i'=i (continue-matching) s has the form MATCH (b, p). Let μ(b)=(l, h). If (l+p)<h, and w (l+p)=w (i) then q'=q, s'=MATCH (b, p+1), i'=i, μ'=μ

(end-matching) s has the form MATCH (b, p). Let μ(b)= (l, h). If (l+p)=h, then q' is the unique successor of q on \b, s'=NOMATCH, and i'=i, μ'=μ

Matching of a back-reference is done by a sequence of transitions. The "begin-matching" transition activates matching a back-reference b. The "continue-matching" transition matches the current input character w (i) against the expected character w (l+p) while keeping the state constant. The "end-matching" transition de-activates matching for b and moves the automaton state forward.

A run r is an accepting run for the input word w of length m if the final pair of the run, ($c_n$=($q_n$, $\mu_n$, $s_n$), $i_n$) is such that $q_n$ is in F and $i_n$=m. The language of a backref-NFA is the set of input words/strings for which there is an accepting run.

Returning to FIG. 2A, in general, steps 230 through 270 are performed in accordance with the above-described formal principles. More specifically, at step 230, it is determined whether the matching process is at the end of the input string. If not, at step 235, it is determined whether the configurations-set is empty. If at any point, the configurations-set becomes empty, the input string cannot be matched to the pattern defined by the backref-regex. Accordingly, if the configurations-set is empty, the method proceeds to step 250, where the string is rejected and the method 200 finishes with step 270.

However, if the configurations-set is not empty, a next character in the input string is determined at step 240. In general, characters of the input string are analyzed in sequence, character-by-character. At step 245, the configurations-set is updated based on the determined character, and the method 200 returns to step 230. As discussed above, generally, the configurations-set contains one or more configurations for moving the matching process along one or more paths of the backref-NFA to determine whether the input string matches the pattern defined by the backref-regex. In general, when the configurations-set is empty, all possible paths have been exhausted and no path for the input string exists within the backref-NFA. More specific details of step 245 are discussed below with respect to FIG. 2B.

If at step 230 it is determined that all characters of the input string have been already considered, the method 200 proceeds to step 255, where the configurations-set is updated to account for all possible epsilon transitions from the configurations included in the configurations-set. More detailed explanation of this step is provided below with respect to FIG. 2B.

At step 260, the current configurations-set is analyzed to determine whether the configurations-set includes a final state, or in other words, includes a configuration associated with the final state. If yes, the match between the input string and the pattern defined by the backref-regex has been detected, and thus, at step 265, the string is accepted. Otherwise, the string is rejected, i.e., the string does not match the pattern defined by the backref-regex.

Figure 2B:
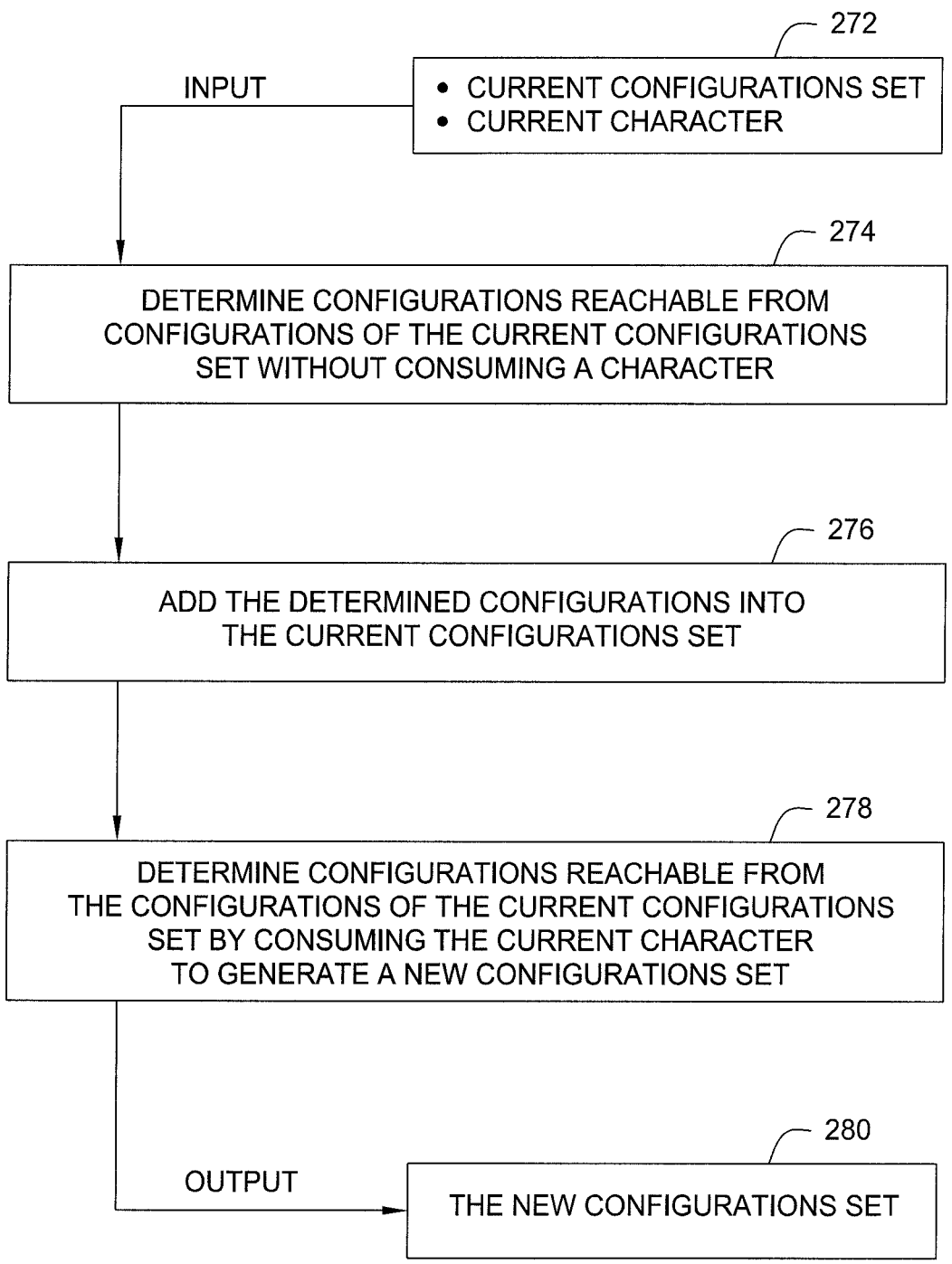
FIG. 2B depicts a high-level block diagram of a method for updating a configurations-set, according to one embodiment.

FIG. 2B depicts a high-level block diagram of a method for updating a configurations-set, according to one embodiment. As described above, the configurations-set is updated at different points of the matching process employed by the method 200, i.e., steps 255 and 245. In general, one main difference between the two updates is that the update of step 255 includes only update based on possible epsilon transitions, while the update of step 245 includes an additional update that is based on possible transitions by consuming the currently selected character. In FIG. 2B, all shown steps are the steps that form step 245. Step 255 includes only steps 274 and 276.

More specifically, input for the method 245 includes a current configurations-set that includes one or more configurations and a character currently analyzed according to method 200. At step 274, all configurations that are reachable from the current configurations-set without consuming the character are determined. In other words, each configuration that may be reached by one or more epsilon transition from the NFA-state associated with the configuration is determined. For example, in FIG. 5A, a configuration associated with state $q_1$ is reached from configuration associated with state $q_0$ in such a manner. Similarly, in FIG. 5B, a configuration associated with state $q_{12}$ is reached from a configuration associated with state $q_1$ without consuming a character of the string.

At step 276, each configuration determined at step 274 is added into the configurations-set. If at step 274 no configurations were found, none will be added.

At step 278, a fresh configuration-set is determined. Specifically, the fresh configuration-set is initially is empty, and it is added-to as follows. For each configuration C in the current configurations-set, those configurations that are reachable from C by consuming the current character (as defined by the automaton structure) are determined and added into the fresh configurations-set. Note that it is possible for a configuration to have no reachable configurations on a given character. It should also be noted that it is possible for some of the newly derived configurations to be identical with those in the current set.

For example, in FIG. 5A, if the configurations-set includes a configuration associated with state q1 and the current character is 'a', then a configuration that can be reached by consuming 'a' will be added to the configurations-set, i.e., a configuration associated with state q2.

The output of the method 245 is an updated configurations-set.

As mentioned above, step 255 includes steps 274 and 276, but not step 278. Accordingly, the output of step 255 is the current configurations-set with all configurations that may be reached from the configurations-set without consuming the character or in other words via epsilon transitions. This assures that when the string matches the pattern defined by the backref-regex, a configuration associated with a final state will be included into the configurations-set. For some backref-regexes, the final state of backref-NFA may only reachable with epsilon transaction, such as shown in FIG. 5B.

Figure 3:
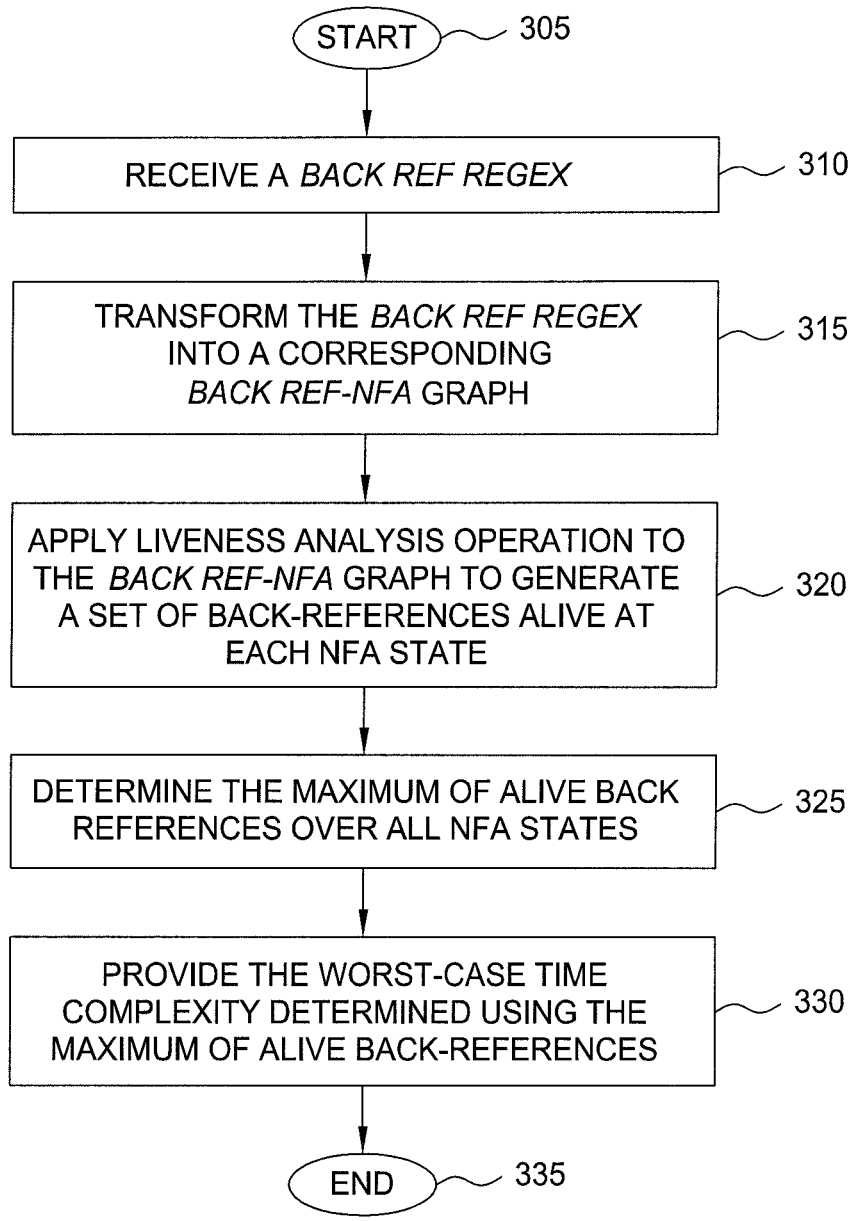
FIG. 3 depicts a high-level block diagram of a method for estimating a worst-case complexity of a rule represented by a regular expression with back-references, according to one embodiment.

FIG. 3 depicts a high-level block diagram of a method for estimating a worst-case complexity of a rule/pattern defined by a backref-regex, according to one embodiment. In general, a method 300 for estimating a worst-case complexity performs static analysis on a backref-NFA derived from a particular backref-regex to provide better bounds for the worst-case space and time complexity. In one embodiment, the computed bounds are used as an admissibility test, to separate out rules/patterns defined by regexes, which are potentially vulnerable to attacks. Such rules may be subject to more detailed manual analysis.

The method 300 starts at step 305 and proceeds to step 310, where a backref-regex defining a particular rule/pattern is received. At step 315, a corresponding backref-NFA is constructed in a manner described above with respect to FIG. 2A. Such a backref-NFA is analyzed at step 320 to determine back-references alive at each NFA-state of the backref-NFA.

According to one embodiment, not each back-reference entry in a configuration associated with a particular NFA-state is useful for further matching. Consider, for example, expression '(ab)\1(cd)\2' shown in FIG. 5A. After the back-reference '\1' has been used to match against an input string, this back-reference is no longer needed for further matching. In particular, in the backref-regex of FIG. 5B, syntactically, there are two back-references and '\1' is "dead" (i.e., unnecessary) after it has been used to match for the first time. Further, in backref-regex, such as '(ab)(cd)\1;R;\2,' the match for \1 is not used in R while might be a large and highly ambiguous regular expression.

Also, for backref-regex with disjoint expressions, not each back-reference is used to match the input string. For example, in expression '(ab)\1|(cd)\2' shown in FIG. 5B the back-references '\1' and '\2' are used along disjoint union expressions, or in other words, along alternative paths of the backref-NFA and at most, only one path would be selected during run of the backref-regex.

According to one embodiment, at step 320, back-references that are guaranteed to be "alive" (i.e., useful) at each NFA-state are determined at compile-time. To determine such back-references, a liveness compiler process, such as the one that is used to determine variables that are still in use at a program point, is adapted for analyzing the backref-NFA structure for live back-references. A description of the liveness compiler process may be found in, for example, AHO, section 9.2.5, pages 608-610, hereby incorporated by reference herein in its entirety. The adaptation of this process for step 320 of the method 300, according one embodiment, is the following:

instead of a "program flow graph", a graph of the backref-NFA is used instead of a "basic block", backref-NFA edges are used instead of variables, back-references are tracked. As discussed above, an edge labeled with '\b' denotes a "use" of back-reference 'b,' while the edges labeled with '($_b$' and ')$_b$,' form a definition of back-reference 'b.'

Applying the adapted liveness process to the backref-NFA, a set of back-references live at each NFA-state of the backref-NFA is generated. For example, for the backref-NFA FIG. 5A, the resulting sets of live back-references are the following: $q_4=\{1\}$, $q_9=\{2\}$, and sets for the remaining NFA-states are empty. For the backref-NFA FIG. 5B, the resulting sets of live back-references are the following: $q_4=\{1\}$, $q_{10}=\{2\}$, and sets for the remaining NFA-states are empty.

At step 325, the maximum number of live references over all states is determined. For example, for the both backref-NFAs of FIGS. 5A and 5B such a number is 2. In one embodiment, at step 330, such information is used to determine the worst-case time complexity. For example, if L is the maximum number of live back-references over all NFA-states of the backref-NFA, then the worst-case time complexity can be tightened to O $(m^*K^*m^{2L})$, where K represents a number of states of the backref-NFA and m is the length of the input string or a packet. The method ends at step 335.

In one embodiment, the matching process is optimized based on the results of the adapted liveness process. For a configuration (q, m, s), entries in m which refer to back-references that are not alive at NFA-state q are dropped to obtain a smaller configuration (q, m', s). This reduction may result in two configurations, which differ only with respect to dead back-references being merged into a single configuration, and thus, the size of the current set is reduced. That is, in various embodiments the configurations/configuration-sets generated during the matching process are reduced in size (i.e., simplified) by removing those back-reference entries that are not alive.

In one embodiment, the worst-case time complexity value is further updated. More specifically, when the backref-NFA for a pattern/rule has a structure such that the matching process is purely deterministic, the match complexity bound may be reduced. For example, consider the backref-regex of the following form: '(a*)b(c*)d;R;\1\2,' where R is an arbitrary regular expression. Assume that $A_1$ represents '(a*)b(c*)d,' and $A_2$ represents 'R;\1\2.' Then, though there are two live back-references in this pattern, a sub-string matching each of the back-references is chosen uniquely. Therefore, there is a unique map, rather than the potential of $m^4$ possible maps with the two live back-references. Accordingly, the worst-case time complexity value may be reduced to O (m*K), which is lower than the bound that would be obtained through simple liveness analysis.

In yet another embodiment, worst-case time complexity values are calculated for all rules/patterns, rule-by-rule, and are used to determine potentially "bad" rules, e.g., rules requiring unreasonably long time to match against worst-case scenario malicious packets. Such rules may be detected automatically and flagged for review by a rule writer. In one embodiment, one or more pre-defined thresholds are used to isolate the potentially "bad" rules. Such thresholds are compared to the determined worst-case time complexity values. In this manner, the rule writer is warned about potentially "bad" rules, the "bad" are isolated, and thus, robust performance in the face of malicious packets is facilitated. For example, consider a regex of the form "(R1)(R2)(R3)(R4)\1\2\3\4" where R1,R2,R3,R4 are sub-expressions and \1,\2,\3,\4 are back-references. For this regex, the algorithm will determine that all 4 back-references are live at some states in the backref-NFA. If the threshold is set to be 2, this exceeds the pre-set threshold, and a warning is optionally generated for the rule-writer.

A person skilled in the art would readily recognize that steps of various above-described methods can be performed by programmed computers. The embodiments of the invention are intended to cover such programmed computers. For example, FIG. 6 depicts a high-level block diagram of a computer suitable for use in performing the functions described herein. As illustrated in FIG. 6, system 600 includes a processor element 620 (e.g., a central processing unit (CPU)); various input/output devices 610 (e.g., storage devices, including but not limited to, a tape drive, a floppy drive, a hard disk drive, flash drive, or a compact disk drive, a receiver, a transmitter, a speaker, a display, an output port, and a user input device (such as a keyboard, a keypad, a mouse, and the like)); a packets/rules processing module 630; and memory 640, e.g., random access memory (RAM) and/or read only memory (ROM). The packets/rules-processing module 630 includes a rule characterization engine 632 and a packet matching engine 634. As shown, the packet/rules-processing module 630 is adapted to access a set of packet matching rules 636. In one embodiment, the packet matching rules are stored in a database, which may be part of the system 600, or alternatively, be separate from the system 600 and communicatively accessible by the system 600.

In general, the rule characterization engine 632 is adapted to estimate a worst-case complexity of a particular rule, such as one of the packet matching rules 636. In one embodiment, the rule characterization engine 632 estimates the worst-case complexity for the rule in accordance with the method 300 described above with respect to FIG. 3. The packet-matching engine 634 is adapted to compare incoming packets against one or more rules and determine whether the packet should be rejected. In one embodiment, the packet matching engine 634 compares the incoming packets against the rules 636 in accordance with the method 200 described above with respect to FIGS. 2A and 2B. Though both engines are shown as being included in the packets/rules-processing module 630, in one embodiment, only one of the engines is included into the packets/rules-processing module 630. Furthermore, in one embodiment, the rule characterization engine 632 and packet-matching engine 634 are placed in two different computing devices. One skilled in the art would recognize that other various implementations are possible.

In one embodiment, at least some of the above-described functions are implemented in software and/or in a combination of software and hardware, e.g., using application specific integrated circuits (ASIC), a general purpose computer, or any other hardware equivalents. The packets/rules processing module 630 may be loaded into the memory 640 and executed by the processor 620 to implement the functions as discussed above. As such, software instructions adapted for implementing the packets/rules processing module 630 (including associated data structures) or its various components may be stored on a tangible computer readable medium (e.g., RAM memory, magnetic or optical drive or diskette, flash drive, and the like), wherein the software instructions when executed by a processor/computer cause the processor/computer to perform the various functions discussed herein with respect to the various embodiments.

Furthermore, it is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking methods described herein may be stored in fixed or removable media and/or stored within a memory within a computing device operating according to the instructions.

Moreover, the embodiments of the invention are also intended to cover program storage devices, e.g., digital data storage media, which are machine or computer readable and encode machine-executable or computer-executable programs of instructions, where such instructions perform some or all of the above-described methods and/or steps. The program storage devices include, but are not limited to, digital memories, magnetic storage media such as magnetic discs or tapes, hard drives, or optically readable data storage media.

A powerful and expressive rule language is necessary to allow an IDS/IPS system to defend the network against complex new attacks. But this power comes at a high cost, especially because the rule writer is typically unaware of the performance consequences of matching packets against complex rules. Poorly written or incorrect rules can be very hard to match efficiently. Embodiments of the invention allow IDS/IPS itself to analyze new rules and ensure that there are no resulting performance vulnerabilities, even in the presence of worst-case packet inputs. In particular, a deterministic matching process is described, where such process allows analyzing rules, rule-by-rule, for the worst-case matching performance and exposing the few rules that are suspected to have performance vulnerabilities. Moreover, techniques that provide on-the-fly deterministic matching of input strings against rules (patterns) defined by regular expressions with back-references are described. Such techniques do not compromise the complexity of the language used to describe the rules while provide guaranteed performance.

Although various embodiments which incorporate the teachings of the present invention have been shown and described in detail herein, those skilled in the art can readily devise many other varied embodiments that still incorporate these teachings.

What is claimed is:

1. A non-transitory computer readable medium storing software instructions which, when executed by a processor, cause the processor to perform a method for estimating a worst-case time complexity of a regular expression comprising one or more back-references (backref-regex), the method comprising:
    constructing a non-deterministic finite automaton (NFA) corresponding to the backref-regex (backref-NFA), wherein the backref-NFA comprises a plurality of NFA-states and a respectively labeled edge for each of the one or more back-references of the backref-regex;
    performing liveness analysis on the backref-NFA to determine for each NFA-state of the backref-NFA a set of back-references alive at the NFA-state; and
    determining a maximum number of alive back-references over the plurality of NFA-states, wherein the determined maximum number is indicative of the worst-case time complexity of the backref-regex.

2. The medium of claim 1, wherein the method further comprises:
    determining a value of the worst-case time complexity of the backref-regex based on the determined maximum number; and
    providing the determined worst-case time complexity value.

3. The medium of claim 2, wherein the backref-NFA further comprises, for each pair of brackets in the backref-regex, a corresponding pair of edges labeled to identify respectively a beginning bracket and an ending bracket, the edges extending from a sub-backref-NFA corresponding to a sub-backref-regex embedded inside the each pair of brackets.

4. The medium of claim 3, wherein the edges of the backref-NFA corresponding to the brackets of the backref-regex represent epsilon transitions.

5. The medium of claim 2, wherein constructing the backref-NFA comprises:
    for each sub-backref-regex embedded in a pair of matching brackets, constructing a corresponding sub-backref-NFA, and additional edges on both sides of the sub-backref-NFA, the additional edges respectively labeled to identify an opening bracket and a closing bracket of the each pair of matching brackets; and
    for each back-reference, constructing an additional edge labeled to indicate the back-reference.

6. The medium of claim 1, wherein the method further comprises:
    comparing a value of the worst-case time complexity indicated by the determined maximum number to a pre-defined threshold; and
    if the indicated worst-case time complexity value is above the pre-defined threshold, flagging a potentially bad pattern.

7. The medium of claim 1, wherein the method further comprises removing from said backref-NFA NFA-state entries referring to back-references that are not alive.

8. The medium of claim 2, wherein the method further comprises:
    comparing the determined worst-case time complexity to a pre-defined threshold; and
    if the determined worst-case time complexity value is above the pre-defined threshold, flagging a potentially bad pattern.

9. The medium of claim 1, wherein the method further comprises selecting a pattern for use in identifying malicious packets if the indicated worst-case time complexity associated with the pattern being below a pre-defined threshold.

10. The medium of claim 9, wherein said method is used to process each of a plurality of pattern-defining regular expressions to provide a set of patterns selected for use in identifying malicious packets.

11. The medium of claim 9, wherein a received packet is identified as a malicious packet when an input string representing the received packet compares favorably with the pattern selected for use in identifying malicious packets.

12. The medium of claim 9, wherein said method further comprises comparing an input string comprising a plurality of characters representing received packet to the pattern selected for use in identifying malicious packets via a single pass of a non-deterministic finite automation (NFA) corresponding to the backref-regex (backref-NFA) to determine whether the input string matches the pattern.

13. The medium of claim 10, wherein said method further comprises forwarding patterns selected for use in identifying malicious packets toward a packet-matching engine adapted to determine whether incoming packets to be rejected.

14. The medium of claim 9, wherein said method further comprises comparing an input string representing a received packet to a pattern defined by a regular expression containing one or more back-references (backref-regex) via a single pass of a non-deterministic finite automaton (NFA) corresponding to the backref-regex (backref-NFA), the input string comprising a plurality of characters, wherein the comparing comprises:
    selecting sequentially characters of the input string until determining that the input string matches the pattern; and
    updating, for each selected character, a configurations-set associated with the selected character, the configurations-set comprising one or more configurations, wherein:
    the updating is based on the one or more configurations, the selected character, and the backref-NFA;
    each of the one or more configurations is associated with a particular NFA-state of the backref-NFA and is adapted to indicate whether a particular back-reference of the backref-NFA is being matched; and
    the updated configurations-set is associated with a next selected character if the input string contains an unselected character;
    updating the configurations-set, after all characters of the input string have been selected, to generate a final configurations-set; and
    determining whether the final configurations-set contains a configuration associated with a final NFA-state.

15. The medium of claim 9, wherein said method is implemented within an intrusion detection system and intrusion prevention system (IDS/IPS) operative to analyze packets transiting between an unsecured network and a secured network.

16. An apparatus, comprising:
    a memory for storing program logic; and
    a processor operably coupled to the memory and configured by the program logic stored thereon to estimate a worst-case time complexity of a regular expression comprising one or more back-references (backref-regex), the regular expression defining a pattern adapted for identifying malicious packets, the program logic comprising:

logic for constructing a non-deterministic finite automaton (NFA) corresponding to the backref-regex (backref-NFA), wherein the backref-NFA comprises a plurality of NFA-states and a respectively labeled edge for each of the one or more back-references of the backref-regex;

logic for performing liveness analysis on the backref-NFA to determine for each NFA-state of the backref-NFA a set of back-references alive at the NFA-state;

logic for determining a maximum number of alive back-references over the plurality of NFA-states, wherein the determined maximum number is indicative of the worst-case time complexity of the backref-regex; and if the indicated worst-case time complexity is below a pre-defined threshold, logic for selecting the pattern for use in identifying malicious packets.

17. The apparatus of claim 16, wherein said apparatus is implemented within an intrusion detection system and intrusion prevention system (IDS/IPS) operative to analyze packets transiting between an unsecured network and a secured network.

18. A tangible and non-transitory computer program product wherein computer instructions, when executed by a processor in a telecom network element, adapt operation of the telecom network element to provide a method for evaluating a pattern to determine if the pattern should be included within a set of patterns used by a malicious packet detector, the malicious packet detector comparing an input string representing a packet received at a network element to one or more patterns within the set of patterns to identify malicious packets, the method comprising:

estimating worst-case time complexity of a regular expression comprising one or more back-references (backref-regex), the regular expression defining a pattern adapted for identifying malicious packets; and if the estimated worst-case time complexity is below a pre-defined threshold, selecting the pattern for inclusion within the set of patterns;

wherein said estimating comprises:

constructing a non-deterministic finite automaton (NFA) corresponding to the backref-regex (backref-NFA), wherein the backref-NFA comprises a plurality of NFA-states and a respectively labeled edge for each of the one or more back-references of the backref-regex;

performing liveness analysis on the backref-NFA to determine for each NFA-state of the backref-NFA a set of back-references alive at the NFA-state; and determining a maximum number of alive back-references over the plurality of NFA-states, wherein the determined maximum number is indicative of the worst-case time complexity of the backref-regex.

19. The computer program product of claim 18, wherein said method further comprises forwarding patterns selected for use in identifying malicious packets toward a packet-matching engine adapted to determine whether incoming packets to be rejected.

20. The computer program product of claim 18, wherein said method further comprises comparing an input string comprising a plurality of characters representing received packet to a pattern selected for use in identifying malicious packets via a single pass of a non-deterministic finite automation (NFA) corresponding to the backref-regex (backref-NFA) to determine whether the input string matches the pattern.

* * * * *